(12) United States Patent
Auracher

(10) Patent No.: US 6,703,605 B2
(45) Date of Patent: Mar. 9, 2004

(54) OPTOELECTRONIC MICROMODULE

(75) Inventor: Franz Auracher, Baierbrunn (DE)

(73) Assignee: Infineon Technologies, AG (DE)

( * ) Notice: Subject to any disclaimer, the term of this patent is extended or adjusted under 35 U.S.C. 154(b) by 0 days.

(21) Appl. No.: 10/001,072

(22) Filed: Oct. 30, 2001

(65) Prior Publication Data

US 2002/0130247 A1 Sep. 19, 2002

(30) Foreign Application Priority Data

Nov. 16, 2000 (DE) .......................................... 100 56 790

(51) Int. Cl.⁷ ................................................ H01J 40/14
(52) U.S. Cl. ......................................... 250/239; 257/81
(58) Field of Search ............................. 250/214.1, 239, 250/216; 257/79, 80, 82, 98, 81

(56) References Cited

U.S. PATENT DOCUMENTS

| | | | | |
|---|---|---|---|---|
| 4,897,711 A | * | 1/1990 | Blonder et al. | 257/48 |
| 5,606,181 A | * | 2/1997 | Sakuma et al. | 257/88 |
| 6,262,413 B1 | * | 7/2001 | Taniguchi et al. | 250/216 |
| 6,271,049 B1 | * | 8/2001 | Auracher et al. | 438/29 |
| 6,307,197 B1 | * | 10/2001 | Krug et al. | 250/227.24 |
| 6,377,592 B1 | * | 4/2002 | Auracher et al. | 372/9 |

FOREIGN PATENT DOCUMENTS

| | | |
|---|---|---|
| DE | 43 13 493 A1 | 5/1994 |
| EP | 0 331 331 A2 | 9/1989 |
| EP | 0 660 467 A1 | 6/1995 |

* cited by examiner

Primary Examiner—Que T. Le
Assistant Examiner—Eric J Spears
(74) Attorney, Agent, or Firm—Jeffrey R. Stone; Briggs and Morgan, P.A.

(57) ABSTRACT

An optoelectronic micromodule (201) comprises an optoelectronic component (204), which is fixed on a main carrier (202) and can emit light in an emission direction (206) directed parallel to a main carrier surface (203) of the main carrier (202), and a radiation variation unit (208), which is arranged in the emission direction (206) and fixed to an auxiliary carrier (209), which has an auxiliary carrier surface (210) which is oriented plane-parallel to the main carrier surface (203) and is in touching contact with the latter. The auxiliary carrier (209) is arranged such that it is shiftable plane-parallel to the auxiliary carrier surface (210) relative to the emission direction (206), thereby enabling a two-dimensional adjustment of the radiation variation unit (208). The radiation variation unit (208) can be adjusted both parallel and perpendicularly to the emission direction (206).

14 Claims, 3 Drawing Sheets

OPTOELECTRONIC MICROMODULE

BACKGROUND OF THE INVENTION

1. Field of the Invention

The invention relates to an optoelectronic micromodule.

2. Description of the Related Arts

Such an optoelectronic micromodule is known from EP 0 331 331 A1, EP 0 660 467 A1 and DE 43 13 493 A1.

EP 0 331 331 A2 discloses an optoelectronic micromodule having an optical component and a focussing lens. The optical component emits optical radiation in an emission direction perpendicular to a main carrier surface. The focussing lens, which is held by an auxiliary carrier, is arranged above the optical component in the emission direction. In this case, the focussing lens can be displaced by means of the auxiliary carrier in such a way as to enable the beam direction to be adjusted. However, one disadvantage of the arrangement described is that an adjustment of the focussing is not possible by a shift of the focussing lens in or counter to the beam direction.

DE 43 13 493 A1 discloses an optoelectronic micromodule in which an optical waveguide is coupled to a light-emitting element by means of a ball lens. In this case, the ball lens is almost arranged in the emission direction of the light-emitting element. The light-emitting element is fixed on a carrier. The ball lens is positioned in an etched trench formed in the carrier. A shift of the ball lens is not provided, however, in the optoelectronic micromodule described. Consequently, adjusting both the beam direction and the focussing of the ball lens can be carried out only in a complicated manner.

FIG. 1 shows a simplified illustration of the optoelectronic micromodule 101 disclosed in EP 0 660 467 A1.

The optoelectronic micromodule 101 has a substrate 102 having a substrate surface 103, on which a laser diode 104, a monitor diode 105 and a glass prism 106 are fixed. The laser diode 104 emits laser radiation parallel to the substrate surface 103 predominantly in a first beam direction 107 and in a second beam direction 108, the latter being oriented in the opposite direction to the first beam direction 107. The monitor diode 105 is part of a control unit (not shown) for the laser diode 104 and, to that end, is arranged on the substrate surface 103 in such a way that laser radiation emitted by the laser diode 104 in the second beam direction 108 can be incident in the monitor diode 105. The glass prism 106 has a mirror surface 109, which forms an angle of 45° with respect to the normal of the substrate surface 103, and is arranged on the substrate surface 103 in such a way that laser radiation emitted by the laser diode 104 in the first beam direction 107 is deflected by the mirror surface 109 from the first beam direction 107 into a third beam direction 110 and, consequently, beam deflection is effected. Said third beam direction 110 is oriented perpendicularly to the substrate surface 103. The glass prism 106 is covered by a lens optical arrangement 111, fabricated in a planar process, with an effective optical region 112 on an area opposite to the substrate surface 103. In this case, the lens optical arrangement 111 is arranged in such a way that laser radiation passes through the effective optical region 112 in the third beam direction 110 and is focussed onto a desired point by said region.

An unsatisfactory optical quality of the focussed laser radiation is achieved by the construction shown in FIG. 1, with the result that typically only a coupling efficiency of approximately 25% is achieved when the laser radiation is coupled into a monomode optical fiber. This is due primarily to the inadequate optical properties of the lens optical arrangement 111 fabricated in a planar process. In the case of the typically high optical aperture of the laser diode 104, the lens optical arrangement 111 exhibits high aberration and, moreover, cannot be fabricated with the required diameter of the effective optical region 112. In addition, the beam deflection is undesirable for many optoelectronic micromodules, for example for optoelectronic micromodules in butterfly housings.

An adjustment of an optoelectronic micromodule which can be effected during operation of the optoelectronic micromodule is referred to as active adjustment.

BRIEF SUMMARY OF THE INVENTION

The invention is based on the problem of providing an optoelectronic micromodule which can be actively adjusted in two dimensions, in which it is possible to dispense with a deflection of the optical beam path and it is also possible to use optical components having high optical quality. In this case, the optical components are provided for influencing light (e.g. focussing, deflection, filtering, modulation, etc.), light being understood to be electromagnetic radiation in the wavelength range from ultraviolet to far infrared.

The problem is solved by means of the optoelectronic micromodule having the features in accordance with the independent patent claim.

An optoelectronic micromodule comprises an optoelectronic component, for example an optoelectronic radiation source, and also a radiation variation unit. The optoelectronic component is fixed on a main carrier and can emit light in an emission direction, the emission direction being directed parallel to a main carrier surface of the main carrier. Furthermore, the radiation variation unit is arranged in the emission direction and fixed to an auxiliary carrier. The auxiliary carrier has an auxiliary carrier surface which is oriented plane-parallel to the main carrier surface and is in touching contact with the latter. Furthermore, the auxiliary carrier is arranged such that it is displaceable plane-parallel to the auxiliary carrier surface relative to the emission direction, thereby enabling two-dimensional adjustment of the radiation variation unit. The radiation variation unit can be adjusted both parallel and perpendicularly to the emission direction.

As an alternative, the optoelectronic component may also emit light in at least two emission directions. It is then advantageous if a radiation variation unit is provided in each emission direction.

Furthermore, a recess may be provided in the main carrier, in which recess the radiation variation unit can be accommodated at least partly such that it is freely moveable during its adjustment without contact with the main carrier.

The recess in the main carrier may also be designed as a through opening.

In a preferred embodiment of the optoelectronic micromodule, a through hole is provided in the auxiliary carrier, in order that the light can leave the optoelectronic micromodule after passing through the radiation variation unit.

Silicon is preferably chosen as fabrication material for both the main carrier and the auxiliary carrier, since the form of the carriers and also of the recesses can be controlled in a specific manner by crystal growth and also preferential etching. Any desired method for crystal growth and also for preferential etching can be used. It is pointed out that silicon carriers can be fabricated with very great precision.

One advantage of the optoelectronic micromodule according to the invention is that the radiation variation unit can be adjusted while the optoelectronic component is emitting, i.e. active adjustment can take place.

In accordance with a first embodiment of the invention, a ball lens may be provided as the radiation variation unit, which ball lens focuses the light emitted by the optoelectronic component through the through hole in the auxiliary carrier for example onto an input end of an optical waveguide.

Instead of a ball lens, however, it is also possible to use other optical components.

In accordance with a second embodiment of the invention, the radiation variation unit is realized by a spherical lens which, just like the ball lens described above, focuses the light emitted by the optoelectronic component through the through hole in the auxiliary carrier for example onto an input end of an optical waveguide.

In a third embodiment of the invention, a planar mirror is provided as the radiation variation unit, which mirror directs the light emitted by the optoelectronic component through the through hole in the auxiliary carrier for example onto an optoelectronic receiver.

A fourth embodiment of the invention envisages that the radiation variation unit can be realized by a focussing mirror. Such a focussing mirror directs the light emitted by the optoelectronic component through the through hole in the auxiliary carrier for example onto an input end of an optical waveguide as well as focuses the light onto said input end.

In accordance with a fifth embodiment of the invention, the radiation variation unit is set up in such a way that a frequency multiplying crystal takes up the light emitted by the optoelectronic component, alters the spectrum of the light and outputs the light altered in this way through the through hole in the auxiliary carrier to a user.

In a sixth embodiment of the invention, a polarizer is provided as the radiation variation unit, which polarizer allows the light emitted by the optoelectronic component to pass through the through hole in the auxiliary carrier only with a specific polarization.

In accordance with a seventh embodiment of the invention, the radiation variation unit is realized by a filter which allows the light emitted by the optoelectronic component to pass through the through hole in the auxiliary carrier after having been filtered in accordance with the filter curve.

Depending on the desired embodiment of the invention with regard to the radiation variation unit, the through hole may be situated at different locations in the auxiliary carrier and also have different cross-sectional forms.

In a further embodiment of the invention, the optoelectronic component is also set up in such a way that it can receive light on at least one side. Instead of at least one emission direction, the optoelectronic micromodule then has at least one receiving direction.

A semiconductor laser diode which emits light of a specific wavelength is preferably chosen as the optoelectronic component. However, it is also possible to use electro-optical filters, optoelectronic semiconductor amplifiers or optoelectronic modulators as the optoelectronic component. Optoelectronic modulators include, for example, electroabsorption modulators, Mach-Zehnder modulators and also laser diodes with monolithically integrated modulators.

Taking account of the optoelectronic component used, the radiation variation unit preferably comprises one or a plurality of optical components.

BRIEF DESCRIPTION OF THE DRAWINGS

Exemplary embodiments of the invention are illustrated in the figures and are explained in more detail below.

In the figures.

DETAILED DESCRIPTION OF THE INVENTION

Figure 1:
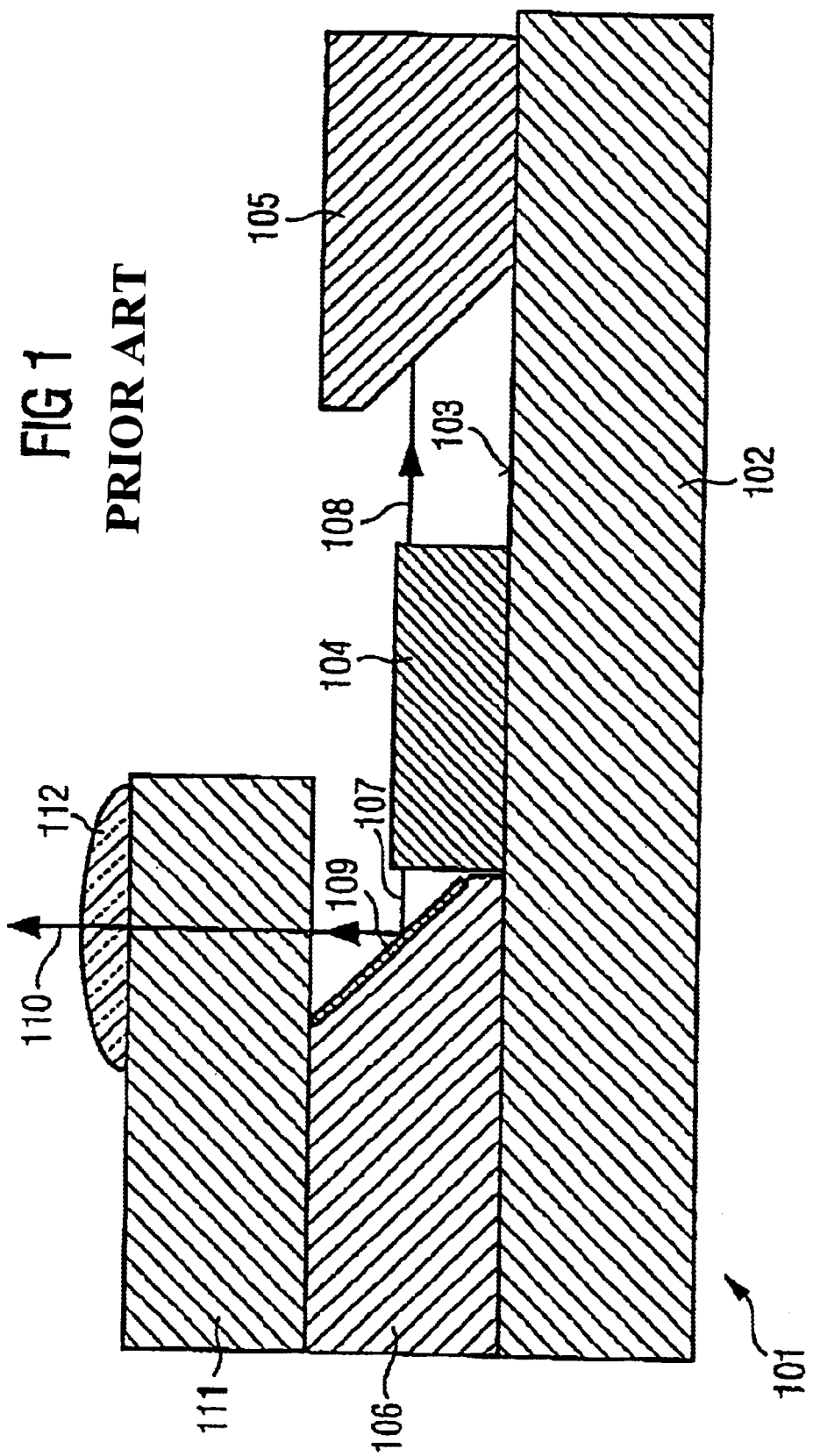
FIG. 1 shows an optoelectronic micromodule according to the prior art.
Figure 2:
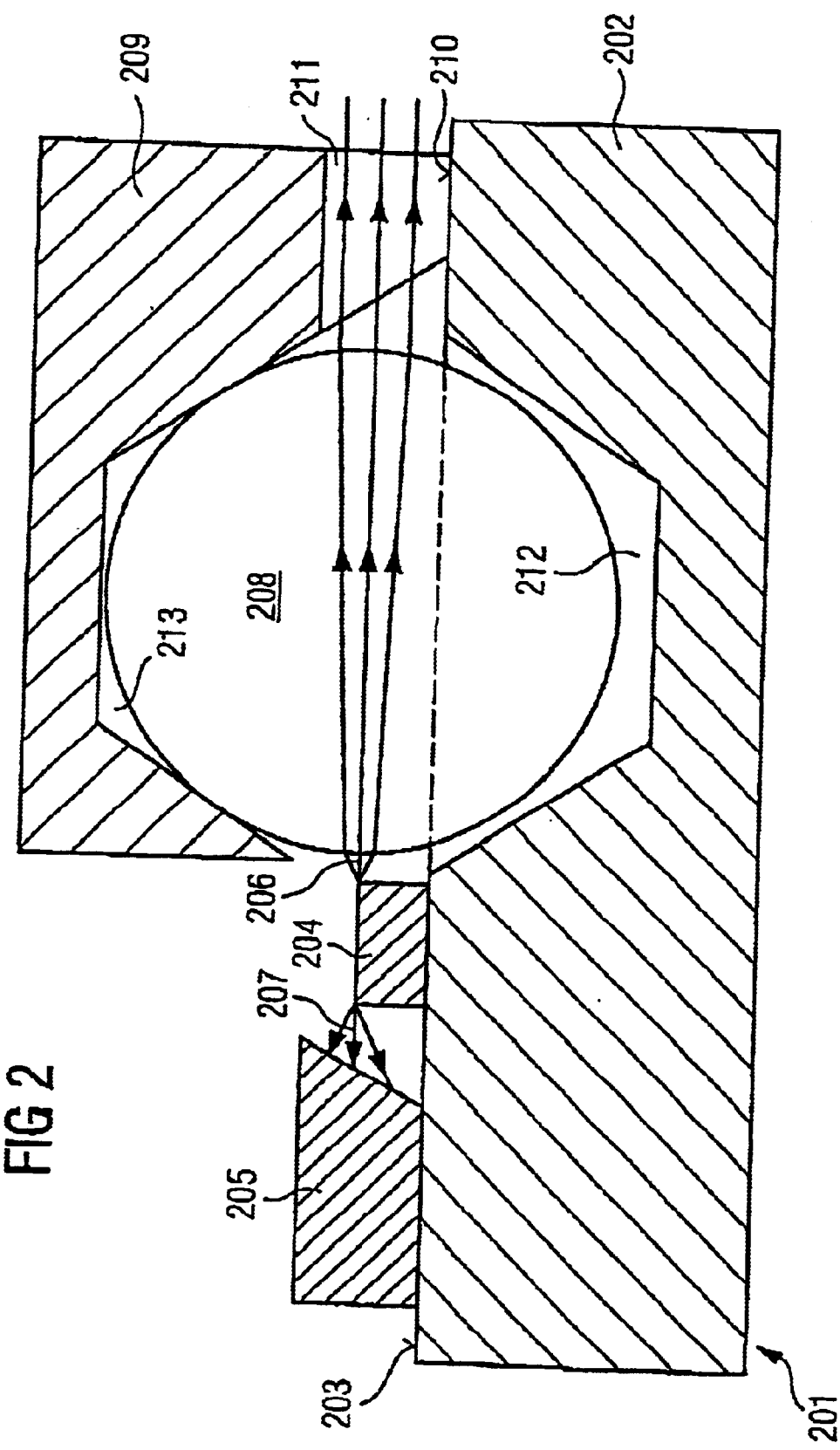
FIG. 2 shows an optoelectronic micromodule according to a first exemplary embodiment of the invention.

FIG. 2 shows an optoelectronic micromodule 201 according to a first exemplary embodiment of the invention.

The optoelectronic micromodule 201 comprises a main carrier 202 having a main carrier surface 203, on which a semiconductor laser diode as optoelectronic component 204 and a sensor 205 are fixed. The optoelectronic component 204 emits light parallel to the main carrier surface 203 predominantly in a first emission direction 206 and in a second emission direction 207, the latter being oriented in the opposite direction to the first emission direction 206.

The sensor 205 is part of a control unit (not shown) for the optoelectronic component 204 as well as arranged on the main carrier surface 203 in such a way that light emitted by the optoelectronic component 204 in the second emission direction 207 can be incident in the sensor 205.

A ball lens serving as radiation variation unit 208 is fixed to an auxiliary carrier 209, which has an auxiliary carrier surface 210 which is oriented plane-parallel to the main carrier surface 203 and is in touching contact with the latter. A through hole 211 is provided in the auxiliary carrier 209 in order that the light emitted in the first emission direction 206 can leave the optoelectronic micromodule 201 unimpeded after passing through the radiation variation unit 208.

The auxiliary carrier 209 is arranged such that it is shiftable plane-parallel to the auxiliary carrier surface 210 relative to the first emission direction 206, thereby enabling, in one plane, two-dimensional adjustment of the radiation variation unit 208 during operation of the optoelectronic component 204. Adjustment of the radiation variation unit 208 in the plane is necessary primarily perpendicularly and parallel to the first emission direction 206 in order to obtain an optical efficiency that is as optimal as possible for the conversion of the light.

In order to enable an adjustment of the radiation variation unit 208, a recess 212 is provided in the main carrier 202, which recess 212 may also be designed as a through opening through the main carrier 202. Said recess 212 is designed in such a way that the radiation variation unit 208 fixed to the auxiliary carrier 209 can, without contact with the main carrier 202, be freely moved and adjusted, and can also be partially accommodated by the recess 212.

During the fabrication of an optoelectronic micromodule 201 according to the invention, after the adjustment of the radiation variation unit 208, i.e. after shifting the auxiliary carrier 209, the auxiliary carrier 209 should be fixed on the main carrier 202.

In the case of an optoelectronic micromodule 201 according to the invention, an optoelectronic receiver could additionally be provided in the first emission direction 206 behind the optoelectronic component 204 and the radiation variation unit 208, in particular when the optoelectronic component 204 is realized by the output of an optical waveguide.

In accordance with the desired variation of the emitted light, furthermore, a spherical lens, a planar mirror, a focussing mirror, a frequency multiplying crystal, a polarizer or a filter may be provided as the radiation variation unit 208. Depending on the chosen type of radiation variation unit 208, the through hole 211 is situated at different locations in the auxiliary carrier 209 and may have different cross-sectional forms.

The radiation variation unit 208 can be glued, glazed or bonded into a depression 213 in the auxiliary carrier 209.

When fabricating the main carrier 202 and the auxiliary carrier 209 from the semiconductor material silicon, it is possible to fabricate the forms presented, in particular the through hole 211, the recess 212 and the depression 213, by preferential etching.

The fixing of the auxiliary carrier 209 to the main carrier 202 after the adjustment of the radiation variation unit 208 can take place by means of soldering, gluing or bonding.

The main carrier surface 203 and the auxiliary carrier surface 210 are preferably made very flat in order to ensure a uniform two-dimensional adjustment of the radiation variation unit 208. The setting of the position of the radiation variation unit 208 perpendicularly to the auxiliary carrier surface 210 can be effected for example by the form of the auxiliary carrier 209, in particular by the configuration of the depression 213 in the auxiliary carrier 209.

Figure 3:
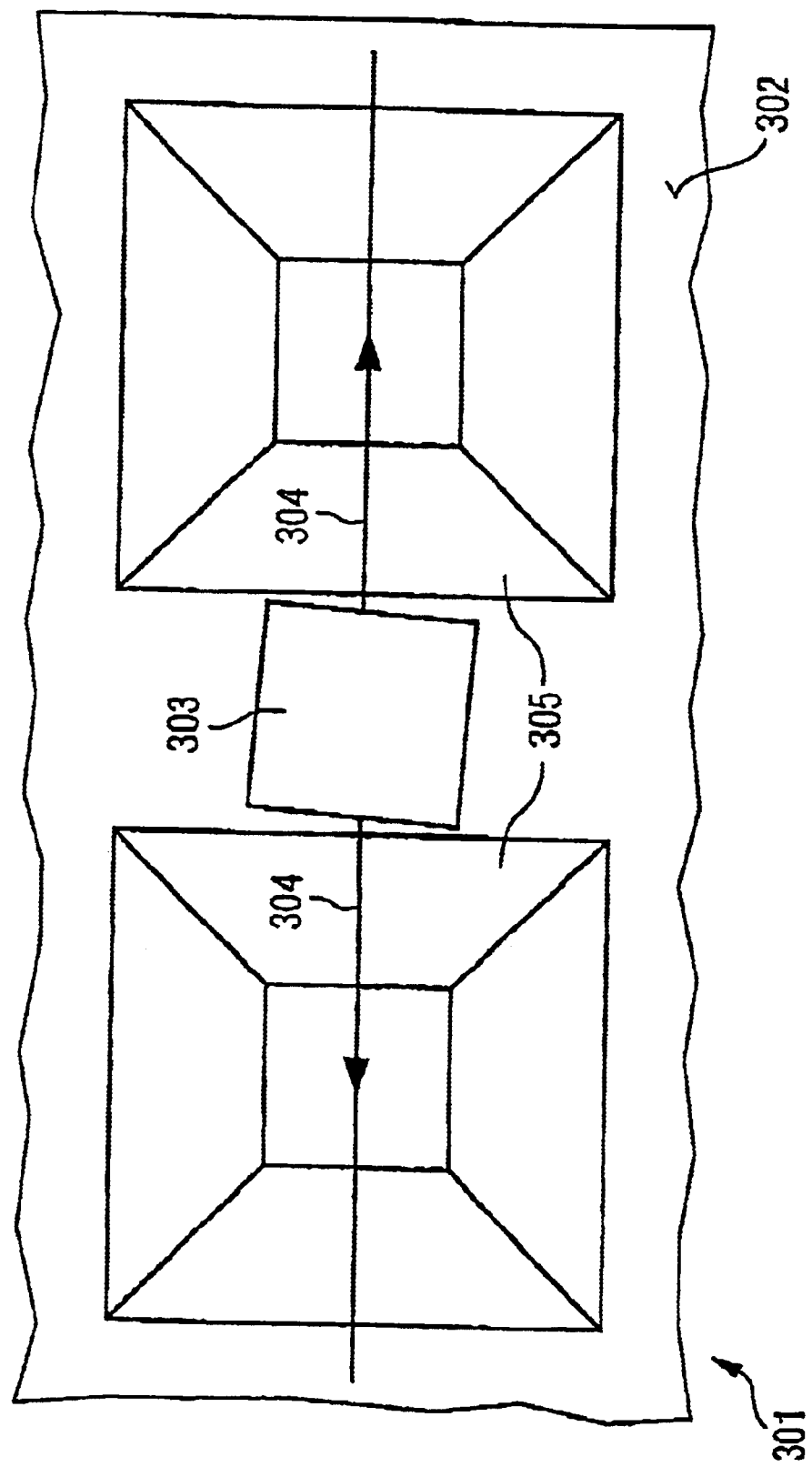
FIG. 3 shows a part of an optoelectronic micromodule according to a second exemplary embodiment of the invention.

FIG. 3 shows a part of an optoelectronic micromodule 301 according to a second exemplary embodiment of the invention.

The optoelectronic micromodule 301 comprises a main carrier surface 302, on which an optoelectronic component 303 emitting on two sides is fixed. The optoelectronic component 303 emitting on two sides emits light into two opposite emission directions 304. A radiation variation unit fixed to an auxiliary carrier is provided in each of the two opposite emission directions 304. For the sake of improved clarity, only a plan view of the main carrier surface 302 is shown, an illustration of the radiation variation units and of the auxiliary carriers having been dispensed with. Details of the components which are not described in this figure can be gathered from the description of FIG. 2. The depressions 305 in the main carrier surface 302 are clearly illustrated, which depressions 305 serve for partially accommodating the radiation variation units and are designed in such a way that, during adjustment of the radiation variation units, the latter are freely moveable without contact with the main carrier.

List of Reference Symbols

101 Optoelectronic micromodule according to the prior art
102 Substrate
103 Substrate surface
104 Laser diode
105 Monitor diode
106 Glass prism
107 First beam direction
108 Second beam direction
109 Mirror Surface
110 Third beam direction
111 Lens optical arrangement
112 Effective optical region
201 Optoelectronic micromodule according to a first exemplary embodiment of the invention
202 Main carrier
203 Main carrier surface
204 Optoelectronic component
205 Sensor
206 First emission direction
207 Second emission direction
208 Radiation variation unit
209 Auxillary carrier
210 Auxillary carrier surface
211 Through terminal
212 Recess
213 Depression
301 Optoelectronic micromodule according to a second exemplary embodiment of the invention
302 Main carrier surface
303 Optoelectronic component emitting on two sides
304 Opposite emission directions
305 Depressions

What is claimed is:

1. An optoelectronic micromodule comprising an optoelectronic component and a radiation variation unit, in which the optoelectronic component is fixed on a main carrier and can emit light in an emission direction, the emission direction being directed parallel to a main carrier surface of the main carrier, in which the radiation variation unit is arranged in the emission direction and fixed to an auxiliary carrier, which has an auxiliary carrier surface which is oriented plane-parallel to the main carrier surface and is in touching contact with the latter, in which the auxiliary carrier is arranged such that it is shiftable plane-parellel to the auxiliary carrier surface relative to the emission direction, thereby enabling a two-dimensional adjustment of the radiation variation unit, and in which the radiation variation unit can be adjusted both parallel and perpendicularly to the emission direction, and wherein a through hole is provided in the auxiliary carrier, through which through hole the light can leave the optoelectronic micromodule after passing through the radiation variation unit.

2. The optoelectronic micromodule as claimed in claim 1, in which a recess is provided in the main carrier, in which recess the radiation variation unit can be accommodated at least partly such that it is freely moveable during its adjustment without contact with the main carrier.

3. The optoelectronic micromodule as claimed in claim 2, in which the recess in the main carrier is a through opening.

4. The optoelectronic micromodule as claimed in claim 2, in which the recess is fabricated by preferential etching.

5. The optoelectronic micromodule as claimed in claim 1, in which a ball lens is provided as the radiation variation unit, which ball lens is fixed in a depression in the auxillary carrier.

6. The optoelectronic micromodule as claimed in claim 5, in which the depression is fabricated by preferential etching.

7. The optoelectronic micromodule as claimed in claim 1, in which the main carrier and the auxiliary carrier are fabricated from silicon.

8. The optoelectronic micromodule as claimed in claim 1, in which the optoelectronic component is provided in such a way that light can be emitted in at least two emission directions.

9. The optoelectromc micromodule as claimed in claim 8, in which each emission direction is provided with a radiation variation unit.

10. The optoelectronic micromodule as claimed in claim 1, in which the optoelectronic component is provided in such a way that it can receive light.

11. The optoelectronic micromodule as claimed in claim 10, in which an optoelectronic semiconductor amplifier is provided as the optoelectronic component.

12. The optoeletronic micromodule as claimed in claim 10, in which an optoelectronic modulator is provided as the optoelectronic component.

13. The optoelectronic micromodule as claimed in claim 10, in which an electro-optical filter is provided as the optoelectronic component.

14. The optoelectronic micromodule as claimed in claim 1, in which the through hole is fabricated by preferential etching.

* * * * *